(12) United States Patent
Harris et al.

(10) Patent No.: US 7,000,829 B1
(45) Date of Patent: Feb. 21, 2006

(54) AUTOMATED BANKING MACHINE KEY LOADING SYSTEM AND METHOD

(75) Inventors: Walter Harris, Uniontown, OH (US); Timothy Zajkowski, Canton, OH (US)

(73) Assignee: Diebold, Incorporated, North Canton, OH (US)

( * ) Notice: Subject to any disclaimer, the term of this patent is extended or adjusted under 35 U.S.C. 154(b) by 273 days.

(21) Appl. No.: 10/620,864

(22) Filed: Jul. 15, 2003

Related U.S. Application Data

(60) Provisional application No. 60/396,605, filed on Jul. 16, 2002.

(51) Int. Cl.
*G06F 17/60* (2006.01)

(52) U.S. Cl. ...................... 235/379; 235/375; 235/382; 705/71

(58) Field of Classification Search ................ 235/375, 235/379, 382, 382.5, 385, 486, 487; 705/50, 705/64, 67, 71
See application file for complete search history.

(56) References Cited

U.S. PATENT DOCUMENTS

| | | | | |
|---|---|---|---|---|
| 4,941,176 A | * | 7/1990 | Matyas et al. .............. 380/280 |
| 5,200,999 A | * | 4/1993 | Matyas et al. .............. 380/277 |
| 5,539,825 A | * | 7/1996 | Akiyama et al. ............. 705/68 |
| 5,745,576 A | * | 4/1998 | Abraham et al. ............. 705/73 |
| 6,104,810 A | * | 8/2000 | DeBellis et al. .............. 380/43 |
| 6,705,517 B1 | * | 3/2004 | Zajkowski et al. ......... 235/379 |

* cited by examiner

*Primary Examiner*—Daniel St Cyr
(74) *Attorney, Agent, or Firm*—Christopher L. Parmelee; Ralph E. Jocke; Walker & Jocke

(57) ABSTRACT

An encryption key transfer system, the system may be operative to generate encrypted files on a portable storage medium which may be used to transfer encrypted keys between ATMs using a single operator. Such secret encrypted keys may include a terminal master key. The system may include a source ATM and a target ATM with a common software program and/or hardware installed in each ATM. The source ATM may use secret information associated with the common software program and/or hardware and other randomly generated information to securely encrypt the secret encryption keys. The source ATM may further store the encrypted secret encryption keys and the randomly generated information on a portable storage medium. The target ATM may be operative to decrypt the secret encrypted keys using the secret information associated with the common software program and/or hardware and the randomly generated information retrieved from the portable storage medium.

47 Claims, 6 Drawing Sheets

AUTOMATED BANKING MACHINE KEY LOADING SYSTEM AND METHOD

CROSS REFERENCE TO RELATED APPLICATIONS

This application claims benefit of U.S. Provisional Application Ser. No. 60/396,605 filed Jul. 16, 2002.

TECHNICAL FIELD

This invention relates to automated banking machines. Specifically this invention relates to an automated banking machine system and method that is capable of loading encryption keys into an automated banking machine.

BACKGROUND ART

Automated banking machines are well known. A common type of automated banking machine used by consumers is an automated teller machine ("ATM"). ATMs enable customers to carry out banking transactions. Common banking transactions that may be carried out with ATMs include the dispensing of cash, the making of deposits, the transfer of funds between accounts, the payment of bills and account balance inquiries. The types of banking transactions a customer can carry out are determined by capabilities of the particular banking machine and the programming of the institution operating the machine. Some types of automated banking machines may allow customers to charge against accounts or to transfer funds. While other types of automated banking machines may print or dispense items of value such as coupons, tickets, wagering slips, vouchers, checks, food stamps, money orders, scrip or traveler's checks. For purposes of this disclosure, an ATM, an automated banking machine, or an automated transaction machine shall, encompass any device which carries out transactions including transfers of value.

Many ATMs are configured to require consumers to enter a Personal Identification Number (PIN) with a keypad of the ATM prior to being granted permission to perform transaction functions with the ATM. The PIN is communicated to a host system by the ATM for purposes of authenticating the identity of the consumer. To prevent the PIN from being stolen by an unauthorized party, ATMs are operative to encrypt the PIN prior to sending the PIN to a host system.

PIN information may be encrypted using a communication (COM) key known to both the ATM and the host system. The COM key may be securely sent to the ATM from the host system by encrypting the COM key with a terminal master key known to both the ATM and the host system. To maintain the secrecy of a terminal master key, when an ATM is being initially configured for operation, the initial terminal master key is often required to be manually installed by a two-person team at the ATM. Each person of the team has knowledge of only a portion of the information necessary to generate the initial terminal master key. To install the terminal master key successfully, each person must input into the ATM his or her known portion of the terminal master key. Once installed, the two portions undergo a mathematical procedure that may result in a sixteen character or other length key which is unknown to either person.

In general, financial institutions and other entities which operate ATMs are responsible for inserting a unique initial terminal master key in their ATMs. Such entities are also responsible for periodically updating the COM key used for PIN encryption. Although the use of two-person teams to install the initial terminal master key increases the security of the system, in general such a protocol increases the maintenance costs per ATM and is generally cumbersome to manage. As a result, existing keys on ATMs are often not updated on a regular basis, which increases their vulnerability to being discovered by an unauthorized party. Consequently, there exists a need for a new system and method of installing the initial terminal master key which is less costly and less cumbersome to perform.

DISCLOSURE OF INVENTION

It is an object of an exemplary form of the present invention to provide an automated banking machine at which a user may conduct transactions.

It is a further object of an exemplary form of the present invention to provide a system and method for securely installing secret encryption keys on an automated banking machine.

It is a further object of an exemplary form of the present invention to provide a system and method for securely installing a terminal master key on an automated banking machine.

It is a further object of an exemplary form of the present invention to provide a system and method for securely installing a terminal master key on an automated banking machine with the use of only a single operator at the ATM.

Further objects of exemplary forms of the present invention will be made apparent in the following Best Modes for Carrying Out Invention and the appended claims.

The foregoing objects are accomplished in an exemplary embodiment by an automated banking machine that includes output devices such as a display screen and receipt printer. The machine may further include input devices such as a touch screen, keyboard, keypad, function keys, and card reader. The automated banking machine may further include transaction function devices such as a cash dispenser mechanism for sheets of currency, a depository mechanism and other transaction function devices which are used by the machine in carrying out banking transactions and transfers of value. In the exemplary embodiment the ATM includes at least one computer. The computer is in operative connection with the output devices and the input devices, as well as with the cash dispenser mechanism, depository mechanism and other physical transaction function devices in the banking machine. The computer is further operative to communicate with a host system located remotely from the ATM.

In the exemplary embodiment, the computer includes software programs that are executable therein. The software programs of the ATM are operative to cause the computer to output user interface screens through a display device of the ATM. The user interface screens include consumer screens which provide a consumer with information for performing consumer operations such as banking functions with the ATM. The user interface screens further include service screens which provide an authorized user servicing the ATM with information for performing service and maintenance operations with the ATM. In addition, the ATM includes software programs operative in the computer for controlling and communicating with hardware devices of the ATM including the transaction function devices.

In an exemplary embodiment, the ATM includes encryption software and/or hardware which is operative to encrypt secret encryption keys. Such secret encryption keys may include, for example, a DES terminal master key or other secret key which may enable an ATM to encrypt information involved with transactions. An encrypted secret encryption key may be written to a portable medium such as a floppy disk at an initial or source ATM. The disk may then be taken to a second or target ATM with corresponding encryption software and/or hardware. The target ATM reads the information from the disk and decrypts the information to produce the original secret encryption keys.

The ATM may use the decrypted secret encryption keys to securely receive further keys from a host system across a network. For example, when a secret encryption key corresponds to a terminal master key, the host system and ATM may use the terminal master key to securely transfer a communication key to the ATM from the host system. The communication key may then be used by the ATM to encrypt PIN information inputted by consumers.

In an exemplary embodiment, both the source and target ATMs may include software and/or hardware with one or more secret tables of data stored therein. The tables of data may include generally random data which is identical at each ATM. The source ATM may further be operative to generate random information responsive to at least one seed value which changes responsive to user inputs. The tables of data and at least a portion of the random information may be used by the source ATM to encrypt the secret encryption keys being stored on the portable storage medium.

In the exemplary embodiment, the source ATM may be operative to fill at least a majority of the storage space on the portable storage medium with a data file that includes the encrypted secret encryption keys. Such a data file may be padded with the random information In an alternative exemplary embodiment, the data file may be generated with a size which fills all or at least the majority of the storage space on the portable storage medium. The data file may also include a portion of the random information which was used to encrypt the secret encryption keys.

In exemplary embodiments, the data file may also be encrypted by the source ATM responsive to the tables of data stored in the software and/or hardware of the ATM. An authorized user may physically transfer the portable storage medium from the source ATM to the target ATM and initiate the loading of the secret encryption keys into the target ATM. The target ATM may be operative to decrypt the data file responsive to the tables of data stored in the software and/or hardware of the ATM. The target ATM may further be operative to decrypt the secret encryption keys responsive to the portion of the random data stored in the data file and responsive to the tables of data stored in the software and/or hardware of the ATM.

BEST MODES FOR CARRYING OUT INVENTION

Figure 1:
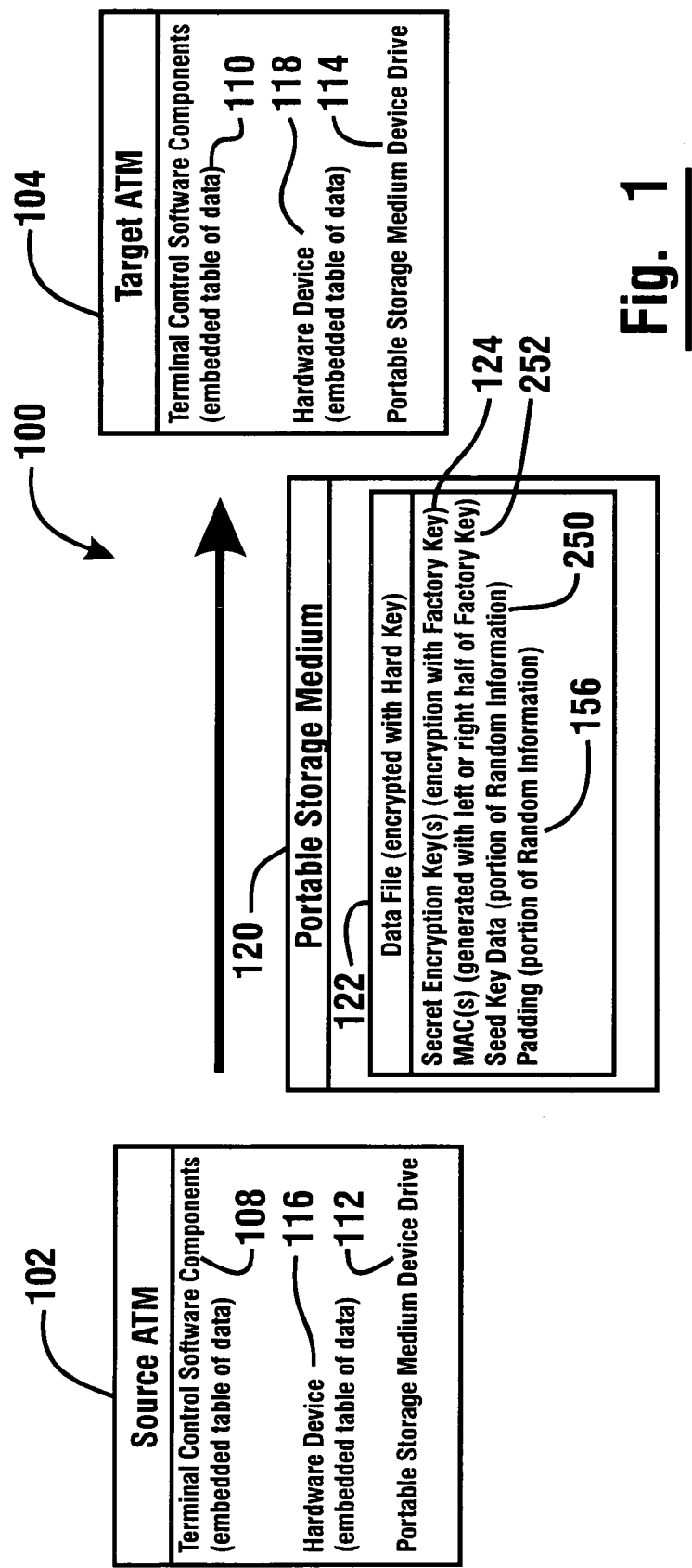
FIG. 1 shows a schematic view of an exemplary embodiment of an automated banking machine key loading system.

Referring now to the drawings and particularly to FIG. 1, there is shown therein a schematic view of an exemplary embodiment of an automated banking machine key loading system 100. The system may include two automated banking machines, a source ATM 102 and a target ATM 104. An authorized user may use the source ATM 102 to generate an encrypted data file 120 on a portable storage medium 120. Such an encrypted data file 120 may include secret encryption keys. The authorized user may then physically transfer the portable storage medium 120 to a target ATM 104, where the encrypted data file 122 and secret encryption keys 124 may be decrypted and loaded into the target ATM 104.

Figure 2:
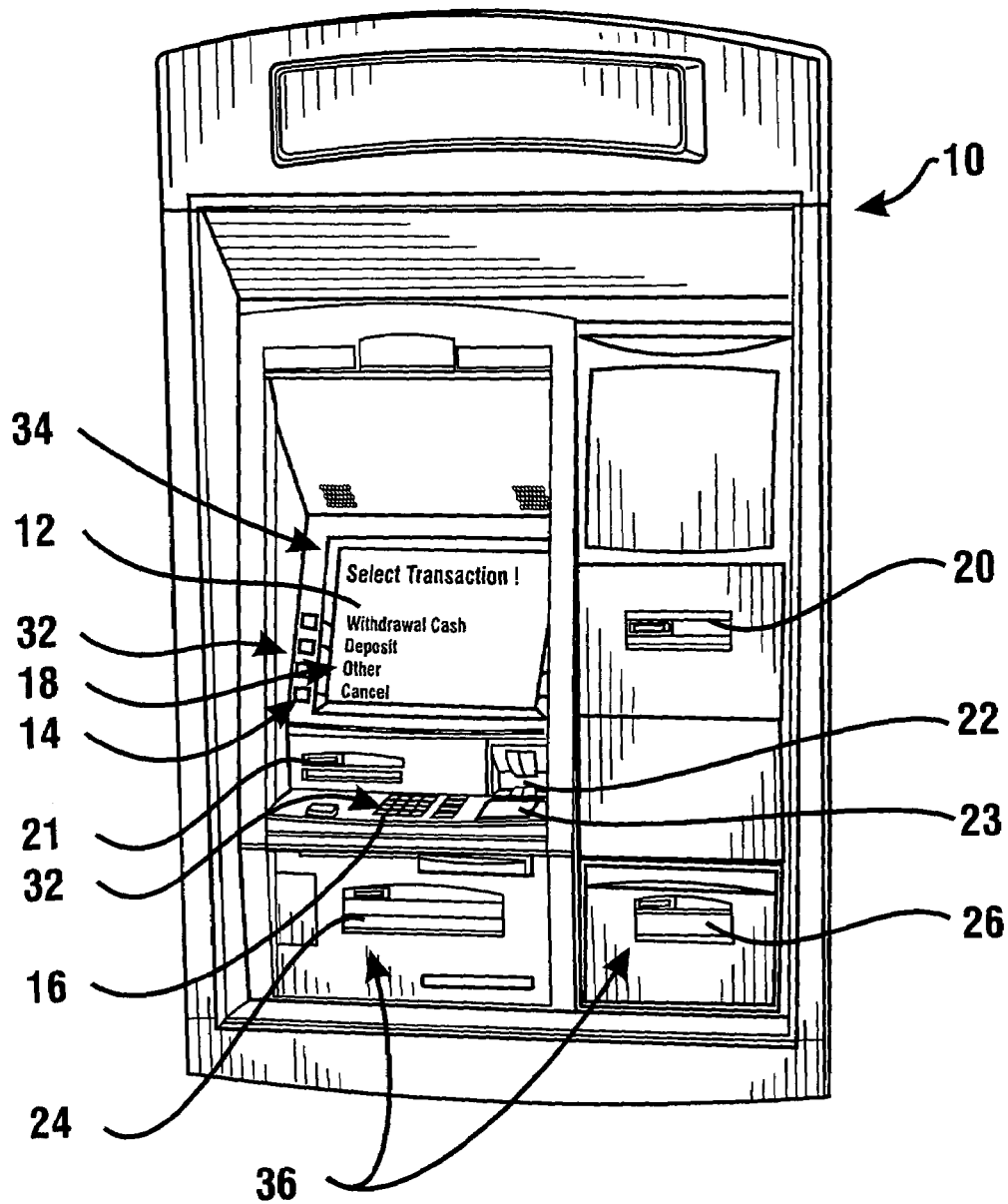
FIG. 2 shows a perspective view of an exemplary automated banking machine.

FIG. 2 shows a perspective view of an exemplary embodiment of an automated banking machine 10 which may correspond to a target ATM 104 and/or a source ATM 102. Here the automated banking machine 10 may include at least one output device 34 such as a display device 12. The output device 12 may be operative to provide a consumer with a user interface 18 that may include a plurality of screens or other outputs including selectable options for operating the machine. The exemplary embodiment may further include other types of output devices such as a receipt printer 20, statement printer 21, speakers, or any other type of device that is capable of outputting visual, audible, or other sensory perceptible information.

The exemplary embodiment of the automated banking machine 10 may include a plurality of input devices 32 such as an encrypting pin pad (EPP) with keypad 16 and function keys 14 as well as a card reader 22 and/or bar code reader 23. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include for example a cash dispenser 24, a depository mechanism 26, a cash recycler mechanism, or any other type of device which is operative to perform transaction functions involving transfers of value.

Figure 3:
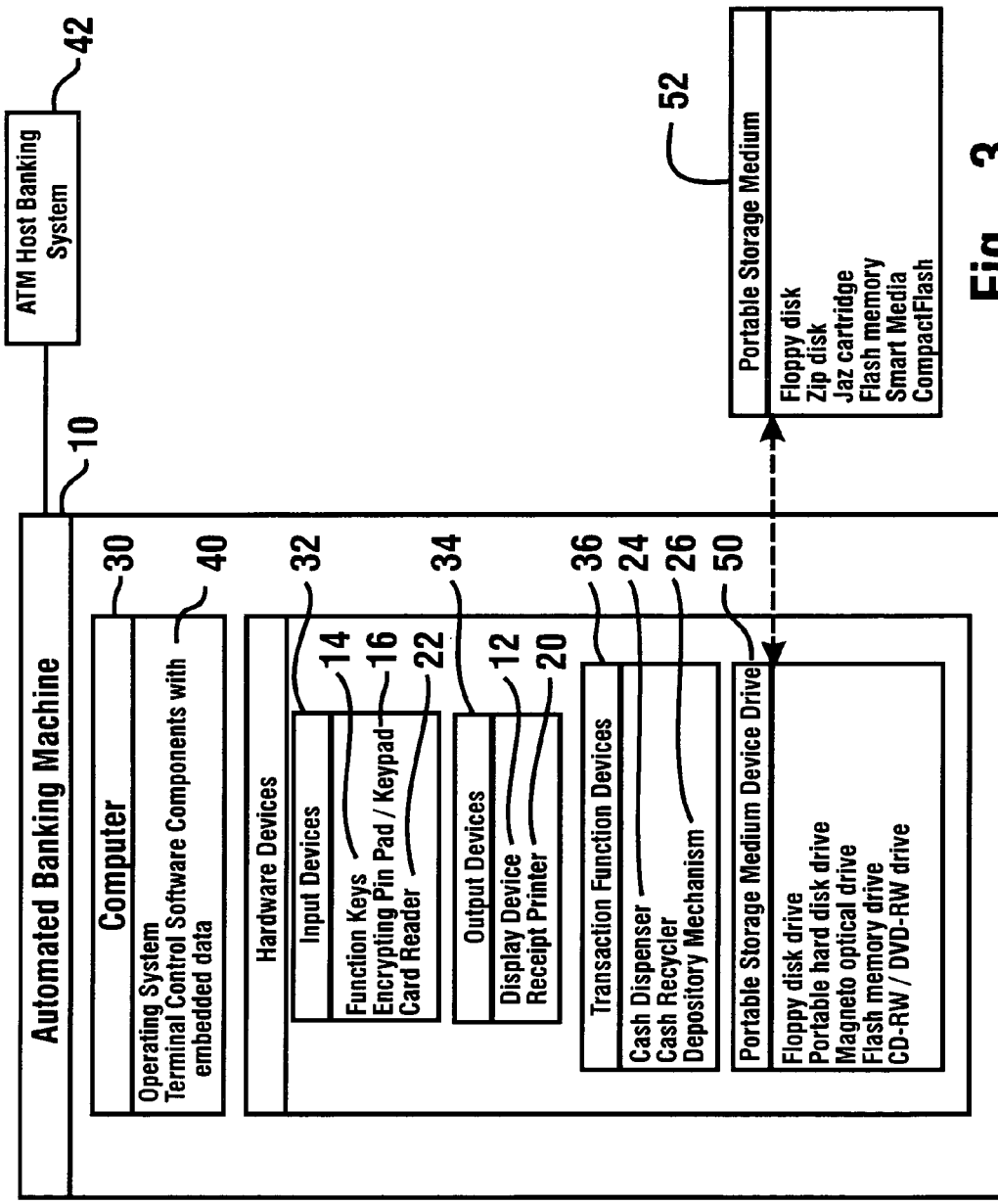
FIG. 3 shows a schematic view of an exemplary automated banking machine.

FIG. 3 shows a schematic view of components which may be included in the automated banking machine 10. The machine 10 may include at least one computer 30. The computer 30 may be in operative connection with the input device(s) 32, the output device(s) 34, and the transaction function device(s) 36. The exemplary embodiment may further include at least one terminal control software component 40 operative in the computer 30. The terminal control software components may be operative to control the operation of the machine by both a consumer and an authorized user such as a service technician. For example such terminal control software components may include applications which enable a consumer to dispense cash, deposit a check, or perform other transaction functions with the machine. In addition the terminal control software components may include applications which enable a service technician to perform configuration, maintenance, and diagnostic functions with the machine.

The exemplary automated banking machine 10 may further include a portable storage medium device drive 50 such as a floppy disk drive which is operative to read and write to a portable storage medium 52 such as a floppy disk. In other exemplary embodiments the portable storage medium device drive may correspond to other types of drive devices that are operative to read and/or write to other portable storage mediums such as Zip 7 disks, flash memory cards, magneto-optical disks, portable hard drives, smart media 7, memory stick 7, and compact flash 7.

Exemplary embodiments of the automated banking machine 10 are operative to communicate with a transaction processing server which is referred to herein as an ATM host banking system 42. Such an ATM host banking system 42 is operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

Referring back to FIG. 1, the exemplary terminal control software 108 of a source ATM is operative to provide an authorized user of the machine such as a service technician with a user interface that guides the operator through the process of generating the encrypted data file 122 on the portable storage medium 120 such as a floppy disk. Such an encrypted data file may include one or more encrypted secret encryption keys 124 stored therein such as a terminal master key. To maximize the security of the encrypted secret encryption keys on the portable storage medium, the exemplary embodiment of the source ATM may be operative to generate a different encrypted data file 122 each time a data file is created regardless of whether the secret encryption key has or has not changed.

The portable storage medium 120 may be removed from the portable storage medium device drive 114 of the source ATM 102 and may be placed in the portable storage medium device drive 114 of one or more target ATMs 104. The exemplary embodiment of the terminal control software 110 of the target ATM is operative to provide an authorized user of the machine with a user interface that guides the user through the process of accessing the encrypted data file 124 from the portable storage medium 120 and decrypting the secret encryption key 124 from the encrypted data file 122. The decrypted secret encryption key 124 may then be loaded into a secure data store of the target ATM. When the decrypted secret encryption key 124 corresponds to a terminal master key, the ATM may then use the terminal master key to securely transfer a communication key between the target ATM and an ATM host banking system over a network. When consumers perform transactions, the target ATM may prompt the consumer to input a personal Identification Number (PIN). The ATM host banking system may use the PIN to verify that the consumer is authorized to perform the transaction. To securely send the PIN to the ATM host banking system, the communication key may be used to encrypt the PIN of the consumer prior to sending the PIN to an ATM host system.

In this described exemplary embodiment, the target ATM will generally be an ATM that is or is intended to be in public service and operative to perform transaction functions for consumers. The source ATM may also be in public service and may be operative to perform transaction functions for consumers. However, in alternative exemplary embodiments, the source ATM may correspond to a machine that is capable of running ATM terminal control software, but may not be configured to perform transaction functions for consumers. For example, the source ATM may correspond to a stripped down ATM that may or may not include an operative cash dispenser. Such a source ATM may be located in a private location such as an ATM service facility or any other private location which is not generally available to the public.

In an exemplary embodiment, the source ATM 102 and the target ATM 104 may include software and/or hardware which is operative to provide both ATMs with access to at least one common secure table of data. In an exemplary embodiment, a portion of the at least one table of data may be stored within the terminal control software components 108, 110 stored on each source ATM 102 and target ATM 104. Also in an exemplary embodiment a portion of the at least one table of data may be stored within at least one hardware device 116, 118 of the ATMs 102, 104 such as an encrypting pin pad. The exemplary embodiments of the terminal control software components 108, 110 may be operative to access the at least one table of data from within itself and/or the hardware devices for use with generating keys which are in turn used to encrypt the secret encryption keys being transferred between the source ATM and the target ATM.

In an exemplary embodiment, the source and target ATMs are operative to generate at least two keys, a hard key, and a factory key. The hard key may be generated by each source and target ATM responsive to the at least one table of data. Because the at least one table of data is constant in the terminal control software components and/or hardware devices of both ATMs, the hard key may remain the same each time it is generated by the source or target ATMs. The factory key may be generated responsive to both the at least one table of data and random information generated by the source ATM. As a result, the factory key may change responsive to the random information.

Figure 4:
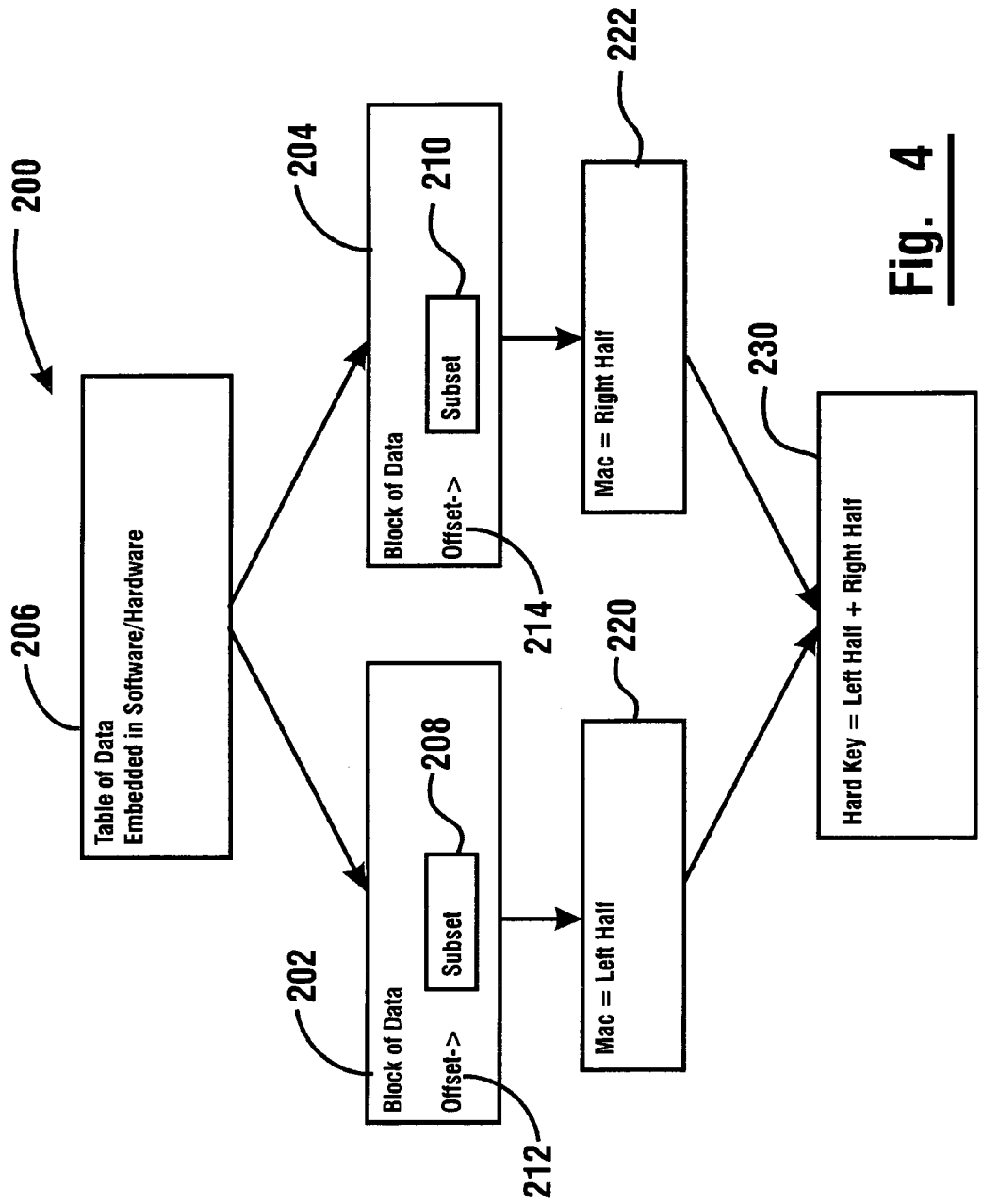
FIG. 4 shows an exemplary embodiment of a process for generating a hard key.

FIG. 4 shows an exemplary embodiment of a process for generating a hard key 230. In this process, the terminal control software at both the source and target ATMs may generate two 256 byte blocks 202, 204 from the at least one table of data 206 embedded in the terminal control software and/or hardware of the ATMs. For each block of data an 8 byte subset 208, 210 may be selected from the blocks. The particular 8 byte subsets may be selected based on predetermined offset values 212, 214 which indicate the position in the blocks 202, 204 to select the subsets 208, 210. The 8 byte subsets correspond to keys for use in generating message authentication check (MAC) values for each of the blocks of data 202, 204. In the exemplary embodiment, the algorithms used to generate the MAC values may include one or more one-way hash functions such as MD5 or SHA or any other hash function which can be used to produce a message authentication check or message digest for a block of data. The resulting MAC values 220, 222 for each block of data may be combined to produce the hard key. In an exemplary embodiment the MAC values 220, 222 may correspond to the left and right halves of the hard key 230 respectively. Alternative exemplary embodiments may generate at least one hard key in a different manner provided both the source and target ATMs are capable of generating at least one hard key which can be used to encrypt and decrypt respectively the data file.

In an exemplary embodiment the source ATM is operative to generate random information from one or more seed values. In an exemplary embodiment, a seed value may correspond to a time at about when a first terminal control software component is started in the computer of the ATM.

In exemplary embodiments, a seed value may be used which corresponds to a number which is continuously being modified. For example in one exemplary embodiment the seed value may be incremented each time an input is received by the computer of the ATM through operation of an input device and/or responsive to each time a message is processed by the main data entry windows of the terminal control software.

Figure 6:
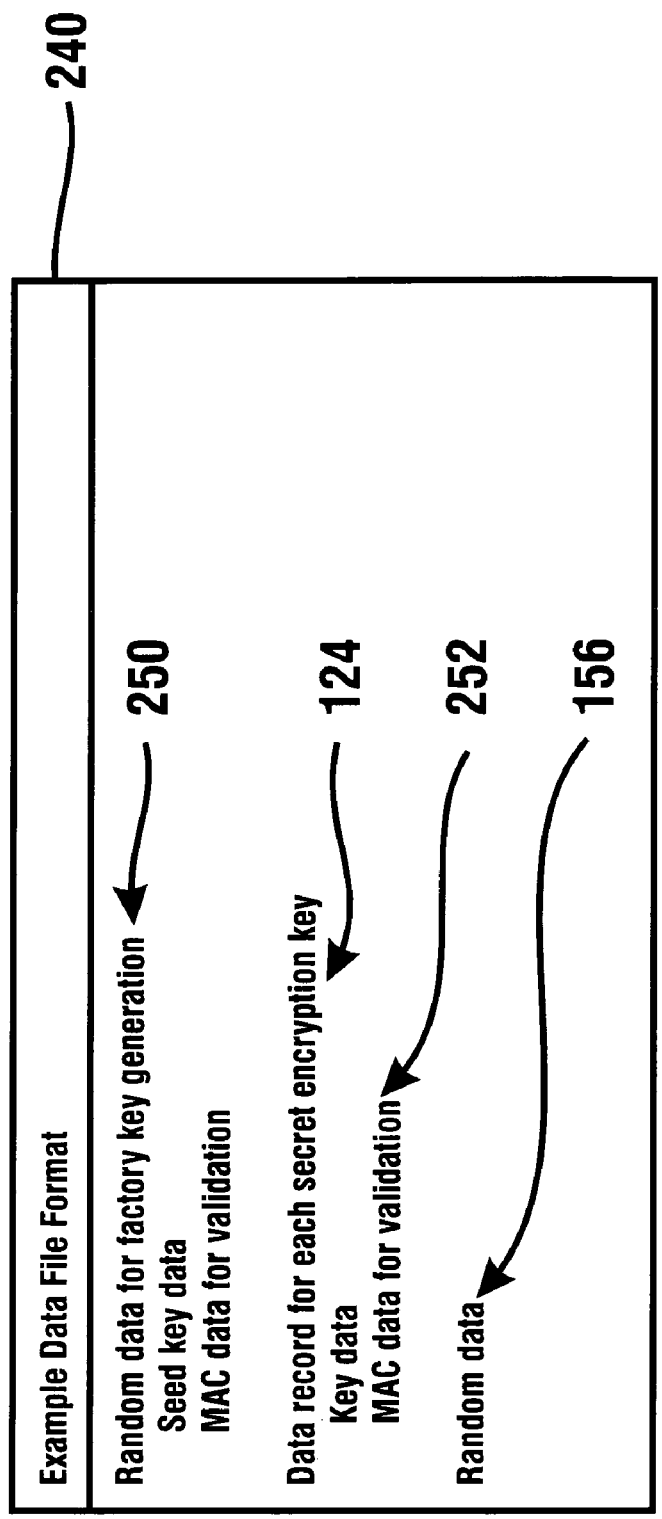
FIG. 6 shows an exemplary embodiment of a format for organizing the information stored in the data file.

In the exemplary embodiment, the source ATM is operative to generate a data file in memory which is padded with random information generated using one or more of the previously described seed values. In an exemplary embodiment the file may always have the same size. However, in alternative exemplary embodiments the file may have a size that varies with each generation of the file. An exemplary format 240 for organizing the data file is shown in FIG. 6. Here the data file format may include at least one portion that is designated as a seed key data 250 and which may be comprised of a plurality of bytes of randomly generated data.

Figure 5:
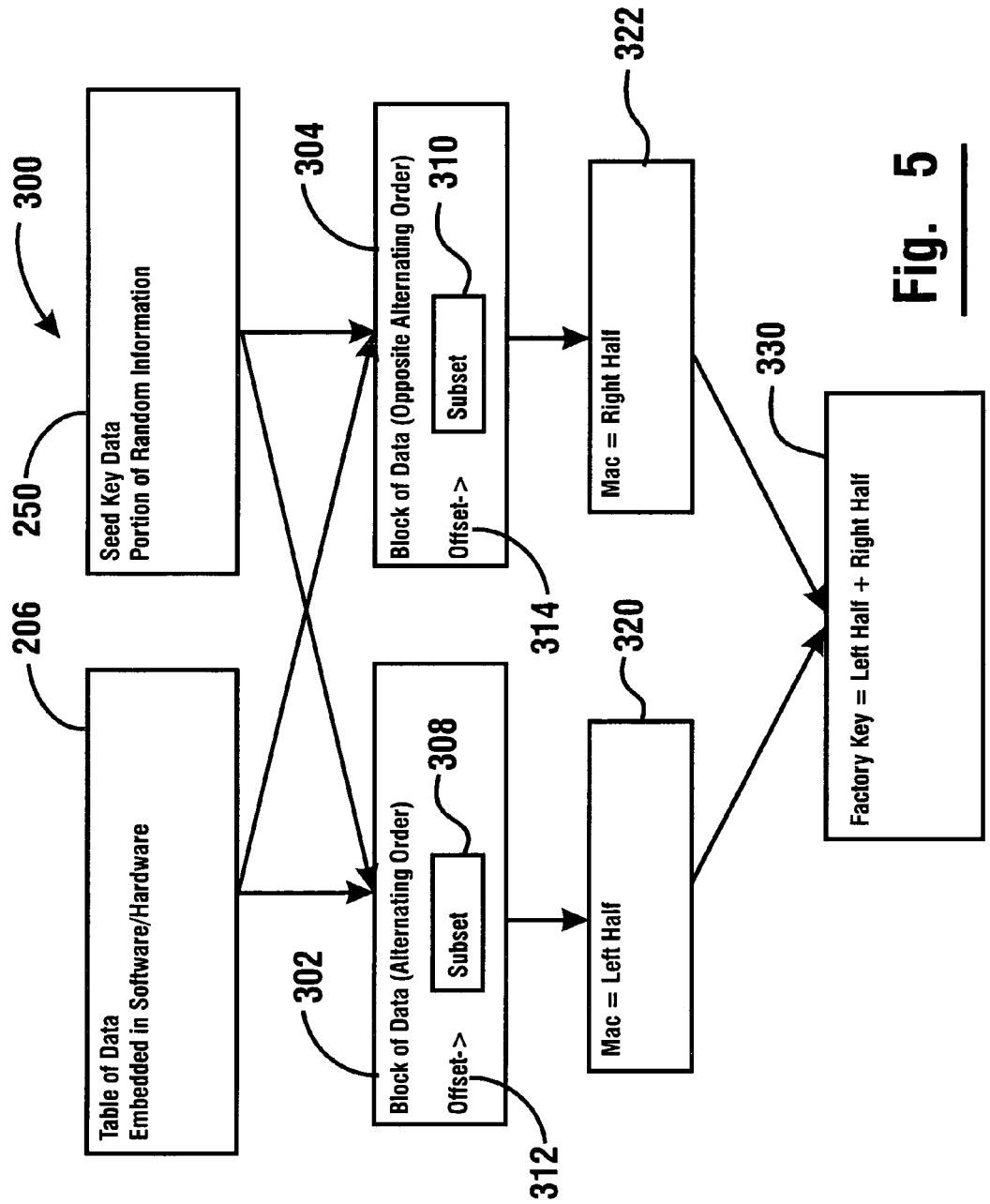
FIG. 5 shows an exemplary embodiment of a process for generating a factory key.

FIG. 5, shows an exemplary process 300 for generating the factory key 330. In this described exemplary embodiment, the source and target ATMs are operative to generate the factory key 330 responsive to the previously described at least one table of data 206 and responsive to the seed key data 250. Here the ATMs are operative to generate two 256 byte blocks of data 302, 304 by combining 128 bytes of data from the table of data 206 with 128 bytes of data selected from the random information which in this described embodiment corresponds to the seed key data 250. For the first block 302, the data from the table of data and the seed key data are combined in a first order. For the second block 304, the data from the table of data and the seed key data are combined in a second order which is different than the first order. For example, the first block may include an alternating progression of the bytes selected from the table of data 206 and the seed key data 250. The second block may include an opposite alternating progression of the bytes selected from the table of data 206 and the seed key data 250.

For each block of data an 8 byte subset 308, 310 may be selected from the blocks. The particular 8 byte subsets may be selected based on predetermined offset values 312, 314 which indicate the position in the blocks 302, 304 to select the subsets 308, 310. The 8 byte subsets are used as keys for use in generating MAC values for each of the blocks of data 302, 304. In the exemplary embodiment, the algorithms used to generate the MAC values may include one or more one-way hash functions such as MD5 or SHA or any other hash function which can be used to produce a message authentication check or message digest for a block of data. The resulting MAC values 320, 322 for each block of data may be combined to produce the factory key. In an exemplary embodiment the MAC values 320, 320 may correspond to the left and right halves of the factory key 330 respectively.

Because the seed key data corresponds to random information generated from variable seed values, the seed key data is different for each data file generated. As a result the factory key corresponding to the data file will be different for each data file generated. In addition, because the seed key data is stored in the data file, the target ATM is enabled to perform the previously described operations to generate a factory key for each data file. The factory key may then be used to decrypt the secret encryption keys stored in the data file.

In the exemplary embodiment, when an authorized user wishes to create an encrypted data file with an encrypted secret encryption key stored on a portable storage medium, the authorized user accesses private configuration screens associated with the terminal control software components of the source ATM. Such configuration screens may prompt the user to enter one or more secret encryption keys through an input device of the source ATM such as a keypad, touchscreen, or keyboard of the source ATM. In the exemplary embodiment, the factory key may be used to encrypt the secret encryption key. As shown in FIG. 1, the source ATM is operative to include the encrypted secret encryption key 124 into the data file 122 along with the seed key data. In further exemplary embodiments, the source ATM may be operative to include more than one encrypted secret encryption key in the data file.

In addition the source ATM may further generate a MAC value for each secret encryption key. Such a MAC value may be generated for the secret encryption key using one of either the left or right portions 220, 222 (FIG. 5) of the factory key. The source ATM may further be operative to include the MAC value for each secret encryption key in the data file.

In an exemplary embodiment, the data file may be initially populated with random information with a size that corresponds to about the expected final size of the file stored on the portable storage medium. In alternative exemplary embodiments the file may be populated with random information so as to have size that generally corresponds to about maximum storage space on the portable storage medium. However, in exemplary embodiments, the size of the file populated with random data may also be relatively smaller than the maximum storage space on the portable storage medium.

A portion of the random information in the file may correspond to the seed key data. The encrypted secret encryption keys and MAC values may then be inserted into the data file so as to replace portions of the random information. In other exemplary embodiments, the data file format 240 shown in FIG. 6 may be initiated in memory as a plurality of structures. The structures which may be populated with one or more encrypted secret encryption keys 124, MAC values 252 for each secret encryption key, seed key data 250, and other information. The structures may then be inserted into the data file so as to replace portions of the random information. In other exemplary embodiments, the data file may be created by concatenating the populated data structures. The resulting concatenation of populated data structures may also be padded with additional random information 156 so as to give the data file a relatively larger size. In other exemplary embodiments, other methods of populating a data file with the encrypted secret encryption keys, MAC values, seed key data, and random information may be used to fill a portable storage medium. Also, in exemplary embodiments, the source ATM may generate a MAC value for the seed key data which may be inserted into the data file.

Once the data file has been generated, the source ATM may be operative to encrypt the data file using the hard key. As shown in FIG. 1, the resulting encrypted data file 122 is written to the portable storage medium 120. The portable storage medium 120 may then be physically transported to a target ATM 104 by an authorized user and inserted into the portable storage medium device drive of the target ATM. The authorized user may then access private configuration screens associated with the terminal control software components of the source ATM. Such configuration screens may include a command option to initiate the loading of ATM encryption keys from a portable storage medium. In response to an authorized user providing an input into an input device of the target ATM which is representative of a command to load ATM encryption keys, the target ATM may access the encrypted data file 122 from the portable storage medium. As described previously, the target ATM is operative to generate the hard key from the at least one table of data stored in the terminal control software components and/or the hardware devices of the target ATM. The generated hard key may then be used by the target ATM to decrypt the data file 122. Once decrypted, the ATM may be operative to retrieve the seed key data 250 and the at least one encrypted secret encryption key from the decrypted data file.

As described previously, the target ATM may be operative to generate a factory key responsive to the seed key data 250 retrieved from the data file and the at least one table of data stored in the terminal control software components and/or the hardware devices of the target ATM. The target ATM may be operative to decrypt the encrypted secret encryption key 124 using the generated factory key. The target ATM may further be operative to generate a MAC value for the decrypted secret encryption key using one of either the left or right hand portions of the factory key. The generated MAC value may then be compared to the corresponding MAC value retrieved from the decrypted data file. If the generated and retrieved MAC values match for each secret encryption key, the exemplary target ATM may be operative to load the secret encryption keys into a secure data store of the target ATM. As described previously, the loaded secret encryption key may correspond to the terminal master key which may be used by the target ATM to securely acquire a communication key from an ATM host banking system over a network. For exemplary embodiments of the data file which also include a MAC value for the seed key data, the target ATM may further be operative to validate that this MAC value corresponds to a MAC value generated from the seed key data by the target ATM.

In the exemplary embodiment, the factory key and the hard key may correspond to double length DES keys, and the encryption and decryption of the secret encryption keys and data file may be performed using a triple DES encryption algorithm. In other exemplary embodiments, other encryption algorithms, types of keys, and key sizes may be used. Also, once generated, the hard key and factory key may only be resident in the memory of the computers of the source and target ATMs and may not be stored on a physical hard drive or portable storage medium. When the power to the ATM is turned off, the hard key and factory key may be erased from memory and thus must be regenerated by the terminal control software once the ATM is restarted.

In the exemplary embodiments at least portions of the table of data may be stored in the compiled machine code of the terminal control software components in a form which cannot be retrieved without executing the terminal control software components in a computer of an ATM. Such terminal control software components may further be configured so as to only be capable of running on a computer of an ATM and not on a generic personal computer.

In further exemplary embodiments, the source ATM may insert an expiration date in the data file. The exemplary target ATM may be operative to deny loading secret encryption keys from the portable storage medium when the current date of the target ATM is equal to and/or greater than the expiration date stored in the data file.

In alternative exemplary embodiments, both the source and target ATMs may include a trusted platform module (TPM) that complies with a trusted computing platform or base specification. The TPM and associated software that interfaces with the TPM may be used to perform one or more of the cryptographic functions described previously with respect to the generation and manipulation of the encrypted data file. In an exemplary embodiment, the TPM may comply with a trusted platform specification such as the Trusted Computing Platform Alliance (TCPA) specification, Microsoft Palladium, Microsoft next-generation secure computing base (NGSCB) or other specification for establishing a secure and trusted computing platform.

In exemplary embodiments, the TPM may be comprised of one or more computer chips integrated into the motherboard of the computer 312. An example of a TPM which may be used with exemplary embodiments of an ATM includes a TPM SLD 9630 chip of Infineon Technologies AG which is based on the TCPA Main Specification version 1.1b. The TPM may also correspond to Microsoft's specification for a security support component (SSC). The software associated with the TPM may include a secure operating system kernel and one or more secure clients. For example with Microsoft's NGSCB, the ATM may include a nexus software layer which interfaces with the TPM. All or portions of the terminal control software of the ATM may be operative to run in a trusted and secure portion of the computer which is managed by the TPM and/or nexus.

For example, the portions of the terminal control software of the source and target ATMs which generate and manipulate the encrypted data file may correspond to a trusted computing application or agent which interfaces with the TPM, nexus or other secure software that comprises the trusted computing platform of the ATMs. Also, in this described exemplary embodiment, secure information related to the generation and manipulation of the encrypted data file, such as the preciously described hard key, table of data, and/or other information may be stored in the ATM in encrypted protected storage managed by the TPM and/or associated software.

Computer software used in operating the automated transaction machines and connected computers may be loaded from articles of various types into the respective computers. Such computer software may be included on and loaded from one or more articles such as diskettes or compact disks. Such software may also be included on articles such as hard disk drives, tapes or read-only memory devices. Other articles which include data representative of the instructions for operating computers in the manner described herein are suitable for use in achieving operation of transaction machines and systems in accordance with exemplary embodiments.

The exemplary embodiments of the automated banking machines and systems described herein have been described with reference to particular software components and features. Other embodiments of the invention may include other or different software components which provide similar functionality.

Thus, the new automated banking machine and system and method achieves one or more of the above stated objectives, eliminates difficulties encountered in the use of prior devices and systems, solves problems and attains the desirable results described herein.

In the foregoing description certain terms have been used for brevity, clarity and understanding. However, no unnecessary limitations are to be implied therefrom because such terms are for descriptive purposes and are intended to be broadly construed. Moreover the descriptions and illustrations herein are by way of examples and the invention is not limited to the details shown and described.

In the following claims any feature described as a means for performing a function shall be construed as encompassing any means capable of performing the recited function and shall not be deemed limited to the particular means shown in the foregoing description or mere equivalents thereof. The description of the exemplary embodiment included in the Abstract included herewith shall not be deemed to limit the invention to features described therein.

Having described the features, discoveries and principles of the invention, the manner in which it is constructed and operated and the advantages and useful results attained; the new and useful structures, devices, elements, arrangements, parts, combinations, systems, equipment, operations, methods, processes and relationships are set forth in the appended claims.

We claim:

1. A method comprising:
    a) providing with a source ATM at least one table of data;
    b) generating with the source ATM a hard key responsive to the at least one table of data;
    c) generating with the source ATM a data file that includes random information;
    d) generating with the source ATM a factory key responsive to the at least one table of data and responsive to at least one first portion of the random information;
    e) encrypting with the source ATM at least one secret encryption key responsive to the factory key;
    f) including the encrypted at least one secret encryption key in the data file;
    g) encrypting with the source ATM the data file using the hard key; and
    h) storing the encrypted data file on at least one portable storage medium in operative connection with the source ATM.

2. The method according to claim 1 further comprising:
    i) receiving the at least one secret encryption key through at least one input device of the source ATM.

3. The method according to claim 2, wherein the at least one input device includes a keypad.

4. The method according to claim 2, wherein the source ATM includes at least one first terminal control software component that is operative to cause a computer in the source ATM to carry out steps (a) through (h), wherein the at least one first terminal control software component includes at least a first portion of the at least one table of data embedded therein.

5. The method according to claim 4, wherein the source ATM includes at least one hardware device, wherein the at least one hardware device includes at least a second portion of the at least one table of data stored therein.

6. The method according to claim 5, wherein the at least one hardware device includes an encrypting pin pad.

7. The method according to claim 4, wherein the at least one portable storage medium includes a floppy disk.

8. The method according to claim 4, wherein further comprising:
    j) generating with the source ATM at least one first seed value;
    k) modifying with the source ATM the at least one first seed value, responsive to at least one input received through operation of at least one input device of the source ATM; and
    wherein in step (c) the random information is generated by the source ATM responsive to the at least one first seed value.

9. The method according to claim 8, wherein prior to step (c) further comprising:
    l) determining a time value that corresponds to about when the at least one first terminal control software component is started in at least one computer of the ATM;
    m) generating with the source ATM at least one second seed value responsive to the time value; and
    wherein in step (c) the random information is further generated by the source ATM responsive to the at least one second seed value.

10. The method according to claim 1, wherein prior to step (g) further comprising:
    i) padding the data file with at least one second portion of the random information.

11. The method according to claim 10, wherein in step (h) the encrypted file has a size which corresponds to about the maximum storage capacity of the at least one portable storage medium.

12. The method according to claim 1, wherein the factory key and the hard key correspond to DES keys, wherein in steps (e) and (g) encrypting of the at least one secret encryption key and the data file is performed using a DES encryption algorithm.

13. The method according to claim 1, wherein prior to step (g) further comprising:
    i) generating at least one first message authentication check (MAC) value responsive to the at least one secret encryption key; and
    j) including the at least one first MAC value in the file.

14. The method according to claim 1, wherein the factory key is comprised of a left portion and a right portion, wherein step (d) includes:
    i) generating a first block of data using the at least one table of data and the at least one first portion of the random information;
    j) generating a first message authentication check (MAC) for the first block of data, wherein the first MAC value corresponds to the left portion of the factory key;
    k) generating a second block of data using the at least one table of data and the at least one first portion of the random information; and
    l) generating a second MAC value for the second block of data, wherein the second MAC value corresponds to the right portion of the factory key, wherein the second MAC value is different than the first MAC value.

15. The method according to claim 14, further comprising:
    m) selecting a first subset of the first block of data, wherein in step (j) the first MAC value is generated using the first subset of the first block of data as a key;
    n) selecting a second subset of the second block of data wherein in step (1) the second MAC value is generated using the second subset of the second block of data as a key.

16. The method according to claim 15, wherein prior to step (i) further comprising:
    o) determining at least one offset value, wherein in steps (m) and (n) the first and second subsets of the corresponding first and second blocks of data are selected responsive to the at least one offset value.

17. The method according to claim 14, wherein prior to step (g) further comprising:
    m) generating at least one third MAC value for at least the at least one secret encryption key using at least one of the left portion or the right portion of the factory key;
    n) including the at least one third MAC value in the file.

18. The method according to claim 14, wherein step (i) includes concatenating bytes from the at least one table of data and the at least one first portion of the random information in a first order, wherein step (k) includes concatenating bytes from the at least one table of data and the at least one first portion of the random information in a second order that is different than the first order.

19. The method according to claim 18, wherein in step (i) the first order includes an alternating progression of the bytes from the at least one table of data and the at least one first portion of the random information, wherein in step (k) the second order includes an opposite alternating progression of the bytes from the at least one table of data and the at least one first portion of the random information.

20. The method according to claim 19, wherein further comprising:
   m) selecting a first subset of the first block of data, wherein in step (j) the first MAC value is generated using the first subset of the first block of data as a key
   n) selecting a second subset of the second block of data, wherein in step (j) the second MAC value is generated data using the second subset of the second block of data as a key.

21. The method according to claim 1, wherein the hard key is comprised of a left portion and a right portion, wherein step (b) includes:
   i) generating a first block of data using the at least one table of data;
   j) generating a first message authentication check (MAC) value for the first block of data, wherein the first MAC value corresponds to the left portion of the hard key;
   k) generating a second block of data using the at least one table of data; and
   l) generating a second MAC value for the second block of, wherein the second MAC value corresponds to the right portion of the hard key, wherein the second MAC value is different than the first MAC value.

22. The method according to claim 1, wherein the source ATM includes a cash dispenser, wherein further comprising:
   i) dispensing cash with the cash dispenser.

23. The method according to claim 1 comprising:
   i) providing with a target ATM the at least one table of data;
   j) generating with the target ATM the hard key responsive to the at least one table of data;
   k) accessing with the target ATM the data file from the at least one portable storage medium;
   l) decrypting with the target ATM the data file using the hard key;
   m) accessing with the target ATM the at least one first portion of the random information from the decrypted data file;
   n) accessing with the target ATM the at least one encrypted secret encryption key from the decrypted data file;
   o) generating with the target ATM the factory key responsive to the at least one table of data and responsive to the at least one first portion of the random information;
   p) decrypting with the target ATM the at least one encrypted secret encryption key responsive to the factory key to produce the at least one secret encryption key.

24. The method according to claim 23, wherein the target ATM includes a cash dispenser, wherein further comprising:
   q) configuring the target ATM responsive to the at least one secret encryption key, wherein the target ATM is enabled to dispense cash using the cash dispenser; and
   r) dispensing cash with the cash dispenser.

25. The method according to claim 24, wherein the target ATM includes at least one second terminal control software component that is operative to cause a computer in the target ATM to carry out steps (i) through (p), wherein the at least one second terminal control software component includes at least the first portion of the at least one table of data embedded therein.

26. The method according to claim 25, wherein the target ATM includes at least one hardware device, wherein the at least one hardware device of the target ATM includes at least the second portion of the at least one table of data stored therein.

27. The method according to claim 26, wherein the at least one hardware device of the target ATM includes an encrypting pin pad.

28. The method according to claim 23, further comprising:
   q) accessing with the target ATM the at least one first message authentication check (MAC) value from the decrypted file;
   r) generating with the target ATM at least one second MAC value responsive to the at least one secret encryption key; and
   s) verifying with the target ATM that the at least one first MAC value corresponds to the at least one second MAC value.

29. The method according to claim 23, wherein prior to step (g) further comprising:
   i) including an expiration date in the data file;
   wherein further comprising;
   j) accessing with the target ATM, the expiration date from the data file;
   k) determining a current date with the target ATM; and
   l) verifying with the target ATM that the expiration date does not exceed the current date.

30. A method comprising:
   a) providing with a target ATM at least one table of data;
   b) generating with the target ATM a hard key responsive to the at least one table of data;
   c) accessing with the target ATM a data file from at least one portable storage medium;
   d) decrypting with the target ATM the data file using the hard key;
   e) accessing with the target ATM at least one seed key data from the decrypted data file;
   f) accessing with the target ATM at least one encrypted secret encryption key from the decrypted data file;
   g) generating with the target ATM a factory key responsive to the at least one table of data and responsive to the at least one seed key data;
   h) decrypting with the target ATM the at least one encrypted secret encryption key responsive to the factory key to produce the at least one secret encryption key.

31. The method according to claim 30, wherein the target ATM includes a cash dispenser, wherein further comprising:
   i) configuring the target ATM responsive to the at least one secret encryption key, wherein the target ATM is enabled to dispense cash using the cash dispenser; and
   j) dispensing cash with the cash dispenser.

32. The method according to claim 31, wherein the at least one secret encryption key corresponds to a terminal master key, wherein step (i) includes:

k) receiving with the target ATM at least one encrypted communication key from a host system;

l) decrypting with the target ATM the encrypted communication key using the terminal master key to produce the communication key, wherein the target ATM is operative to securely send a personal identification number (PIN) inputted through at least one input device of the target ATM to the host system using the communication key.

33. The method according to claim 31, wherein the target ATM includes at least one first terminal control software component that is operative to cause a computer in the target ATM to carry out steps (a) through (h), wherein the at least one first terminal control software component includes at least a first portion of the at least one table of data embedded therein.

34. The method according to claim 33, wherein the target ATM includes at least one hardware device, wherein the at least one hardware device includes at least a second portion of the at least one table of data stored therein.

35. The method according to claim 34, wherein the at least one hardware device includes an encrypting pin pad.

36. The method according to claim 31, wherein step (i) includes concatenating bytes from the at least one table of data and the at least one seed key data in a first order, wherein step (k) includes concatenating bytes from the at least one table of data and the at least one seed key data in a second order that is different than the first order.

37. The method according to claim 36, wherein in step (i) the first order includes an alternating progression of the bytes from the at least one table of data and the at least one seed key data, wherein in step (k) the second order includes an opposite alternating progression of the bytes from the at least one table of data and the at least one seed key data.

38. The method according to claim 30, further comprising:
   i) accessing with the target ATM at least one first message authentication check (MAC) value from the decrypted file;
   j) generating with the target ATM at least one second MAC value responsive to the at least one secret encryption key; and
   k) verifying with the target ATM that the at least one first MAC value corresponds to the at least one second MAC value.

39. The method according to claim 30, wherein the factory key is comprised of a left portion and a right portion, wherein step (g) includes:
   i) generating a first block of data using the at least one table of data and the at least one seed key data;
   j) generating a first message authentication check (MAC) value for the first block of data, wherein the first MAC value corresponds to the left portion of the factory key;
   k) generating a second block of data using the at least one table of data and the at least one first portion of the decrypted file; and
   l) generating a second MAC value for the second block of data, wherein the second MAC value corresponds to the right portion of the factory key, wherein the second MAC value is different than the first MAC value.

40. The method according to claim 39, further comprising:

m) selecting a first subset of the first block of data, wherein the first MAC value is generated using the first subset of the first block of data as a key;

n) selecting a second subset of the second block of data, wherein the second MAC value is generated using the second subset of the second block of data as a key.

41. The method according to claim 40, wherein prior to step (i) further comprising:
   o) determining at least one offset value, wherein in steps (m) and (n) the first and second subsets of the corresponding first and second blocks of data are selected responsive to the at least one offset value.

42. The method according to claim 39, wherein prior to step (g) further comprising:
   m) accessing with the target ATM at least one third MAC value from the decrypted file;
   n) generating with the target ATM at least one fourth MAC value for at least the at least one secret encryption key using at least one of the left portion or the right portion of the factory key; and
   o) verifying with the target ATM that the at least one third MAC value corresponds to the at least one fourth MAC value.

43. The method according to claim 30, wherein the hard key is comprised of a left portion and a right portion, wherein step (b) includes:
   i) generating a first block of data using the at least one table of data;
   j) generating a first message authentication check (MAC) value for the first block of data, wherein the first MAC value corresponds to the left portion of the hard key;
   k) generating a second block of data using the at least one table of data; and
   l) generating a second MAC value for the second block of data, wherein the second MAC value corresponds to the right portion of the hard key, wherein the second MAC value is different than the first MAC value.

44. The method according to claim 43, further comprising
   m) selecting a first subset of the first block of data, wherein in step 0) the first MAC value is generated using the first subset of the first block of data as a key;
   n) selecting a second subset of the second block of data, wherein in step (k) the second MAC value is generated using the second subset of the second block of data as a key.

45. The method according to claim 30, wherein the data file includes an expiration date, wherein further comprising:
   i) accessing with the target ATM the expiration date from the data file;
   j) determining a current date with the target ATM; and
   k) verifying with the target ATM that the expiration date does not exceed the current date.

46. The method according to claim 30, wherein the at least one portable storage medium includes a floppy disk.

47. The method according to claim 30, wherein the factory key and the hard key correspond to DES keys, wherein in steps (e) and (g) encrypting of the at least one secret encryption key and the data file is performed using a DES encryption algorithm.

* * * * *